United States Patent [19]
Madsen et al.

[11] 3,762,251
[45] Oct. 2, 1973

[54] APPARATUS AND METHOD FOR SKIN PACKAGING ARTICLES

[75] Inventors: Bernhardt Madsen; Edward R. Pozsony, both of Clarks Summit, Pa.; Everett E. Collin, Camills, N.Y.

[73] Assignee: U. S. Packaging Corporation, Greenville, S.C.

[22] Filed: May 15, 1972

[21] Appl. No.: 253,442

Related U.S. Application Data
[62] Division of Ser. No. 127,647, March 24, 1971.

[52] U.S. Cl.................... 83/39, 83/56, 83/404.2, 83/408, 83/433, 83/925 R
[51] Int. Cl........................ B26d 3/12, B65b 61/08
[58] Field of Search ............... 83/39, 56, 255, 256, 83/404.2, 407, 408, 302, 482, 433, 925 R, 47; 53/112 A

[56] References Cited
UNITED STATES PATENTS

| 2,976,658 | 3/1961 | Kostur | 83/408 X |
| 3,553,931 | 1/1971 | Rorer | 83/408 X |
| 3,574,291 | 4/1971 | Rosendahl | 83/408 X |

*Primary Examiner*—J. M. Meister
*Attorney*—Martin, Ferguson & Baker

[57] ABSTRACT

A system for skin packaging articles including a loading zone for positioning articles to be packaged upon a substrate, a thermoplastic film heating and vacuum operated skin packaging zone for covering the articles with film laminated to the substrate and slitting zone for separating and trimming the individual skin packaged articles. The articles are passed to the successive zones. The loading zone may be adapted for conveyorized instead of hand loading. In some cases, where only transverse cutting of the film web is necessary, it may be desirable to eliminate the slitting zone and remove the skin packaged article or articles directly from the packaging zone. A conveniently located operating panel contains controls for effecting automatic, semi-automatic or manual operation of the entire system or any portions thereof in any manner desired.

More specific novel features of the invention comprise the provision of heat shield plates pivotally mounted for positioning above the heating elements to serve as reflectors to direct heat uniformly downwardly upon the film to be softened and deformed in the skin packaging zone and, alternatively, for positioning beneath the heating elements to shield the deformed film from further heating as desired during the vacuum skin packaging operation. Another specific feature comprises the novel arrangement of discs or other cutting means in the slitting zone to maintain an uncut border at opposed ends of the substrate board and laminated film so that the longitudinally slit strips of skin packaged articles within the border may be handled as a unit for separating into individual packages by a terminal transverse slitting operation.

The invention visualizes the heating and packaging zone as a nucleus of the system around which selected article loading, removal and other devices may be associated to suit the requirements of specific article skin packaging operations.

8 Claims, 22 Drawing Figures

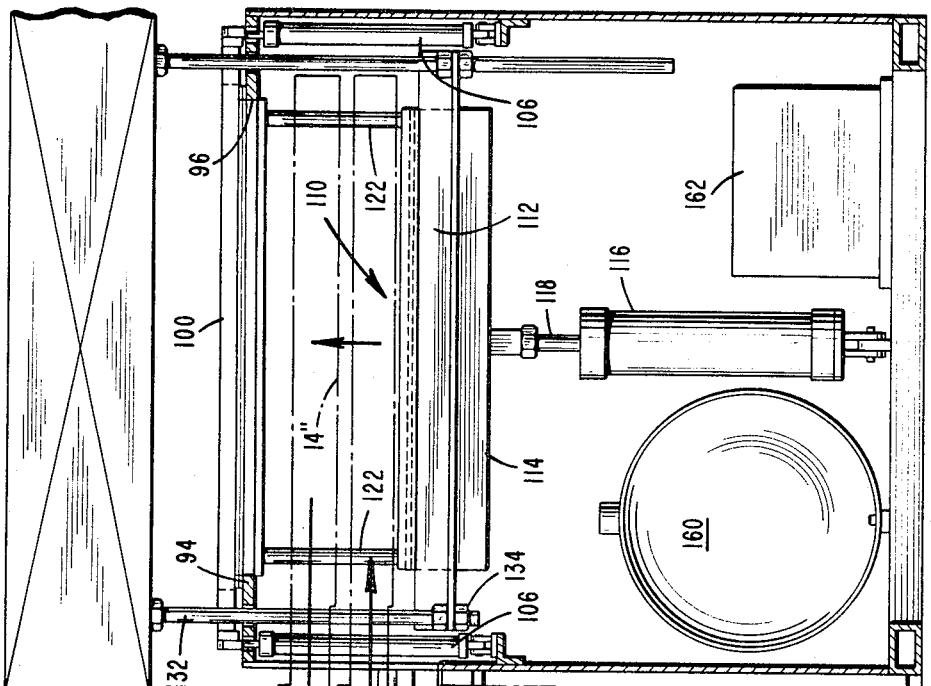
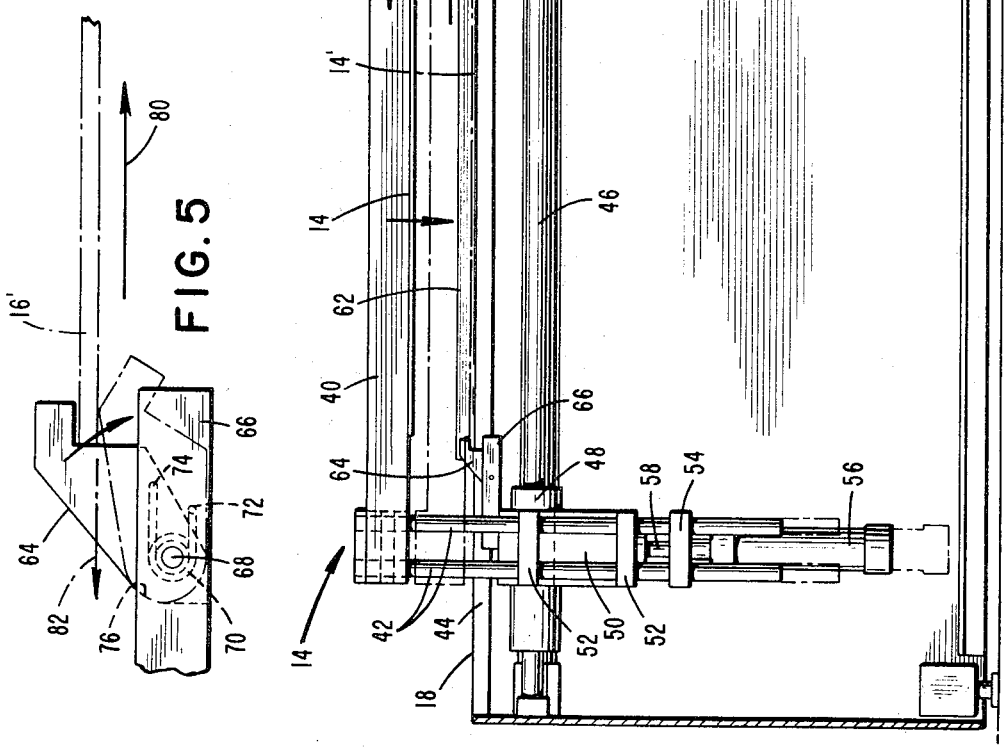

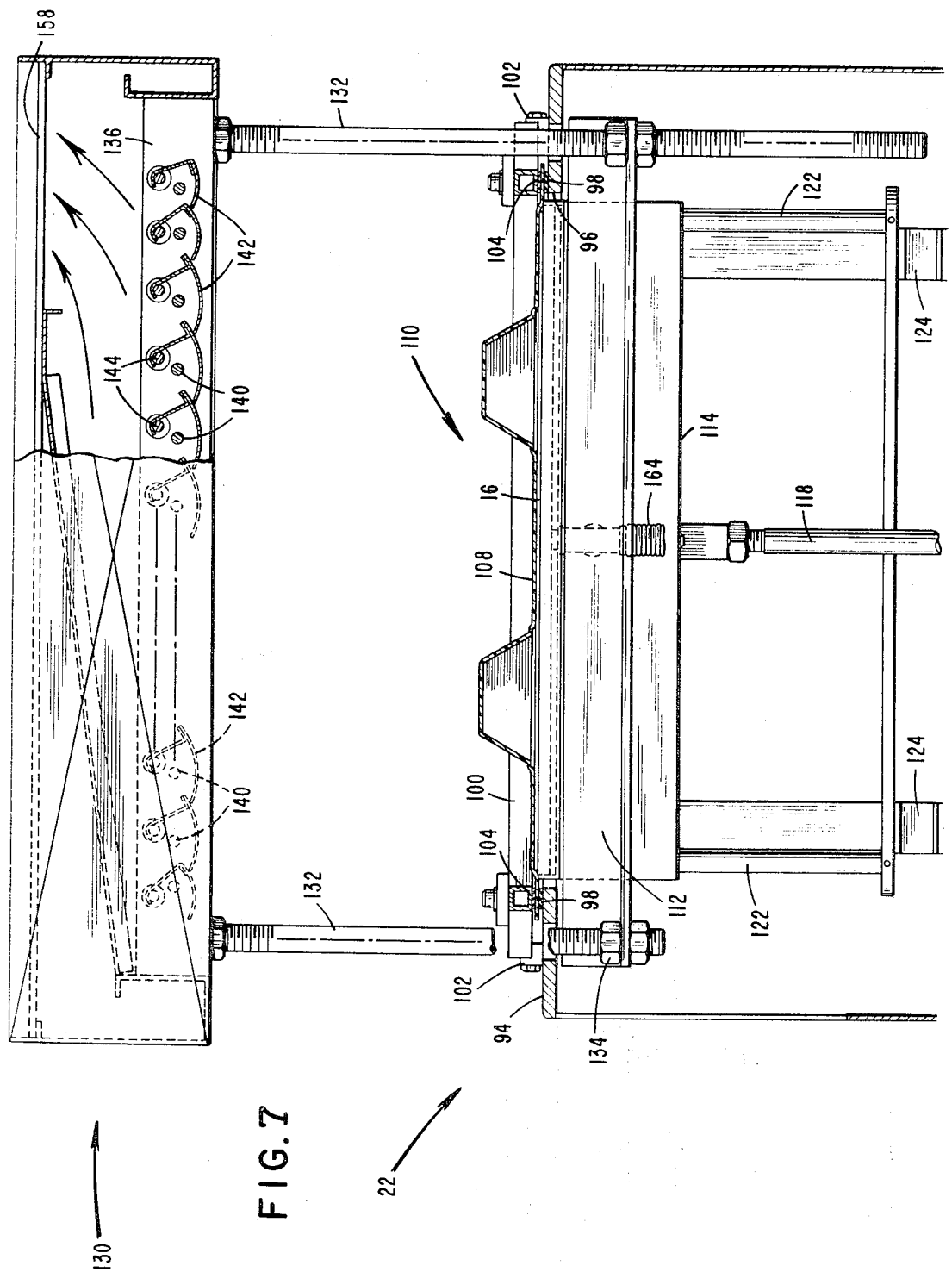

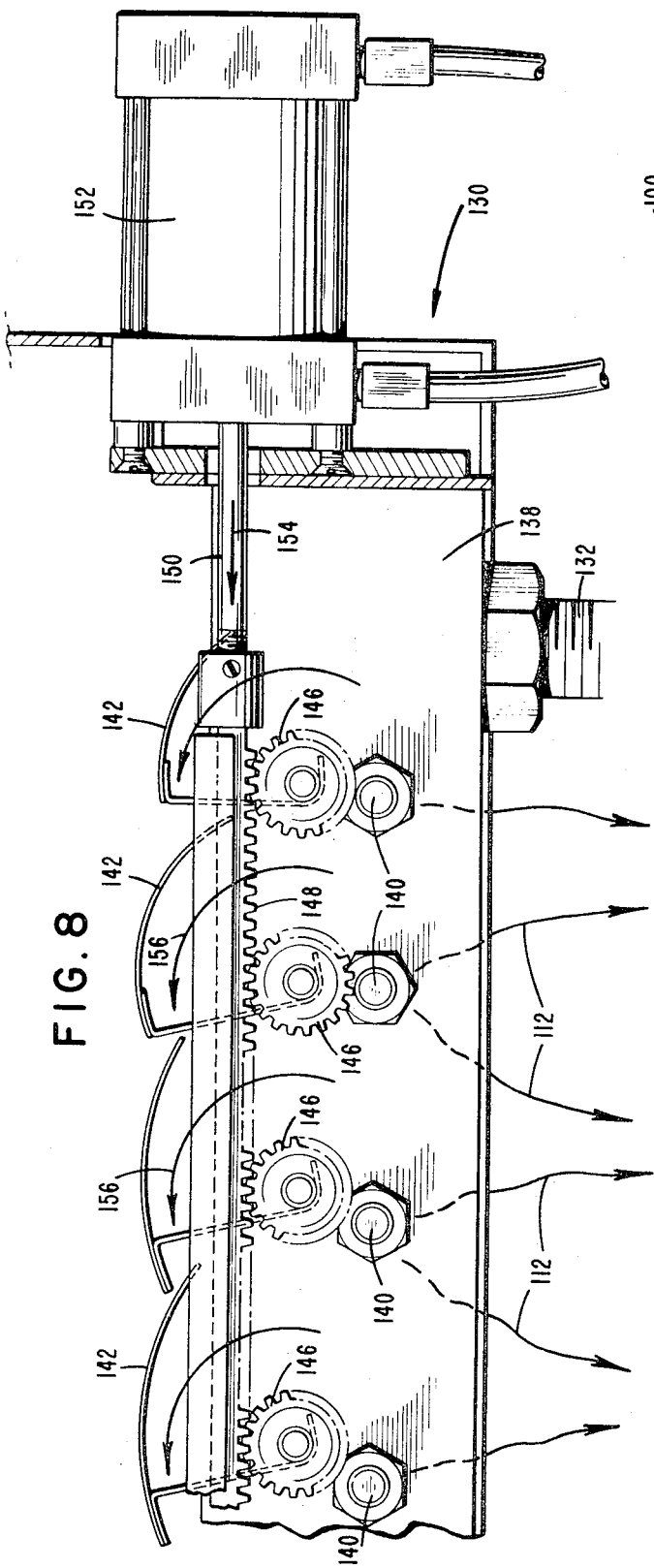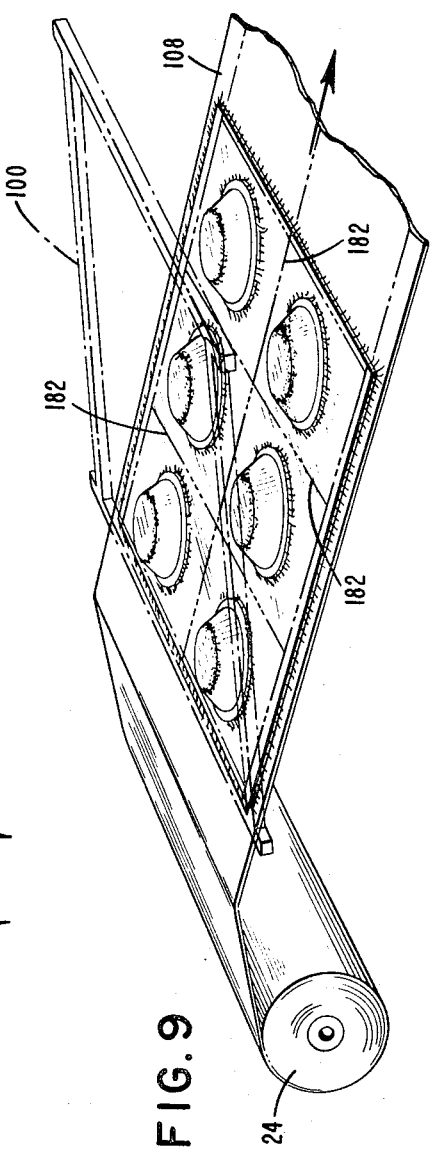

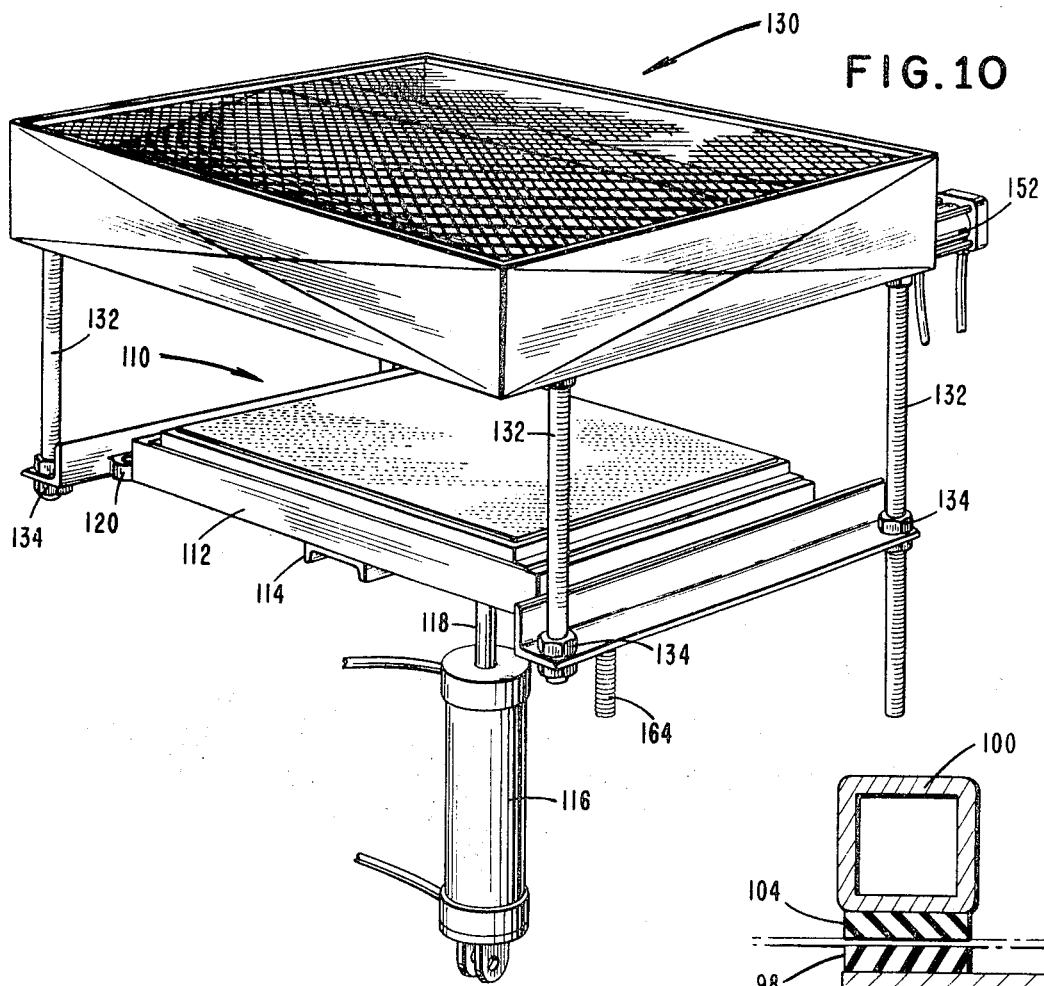
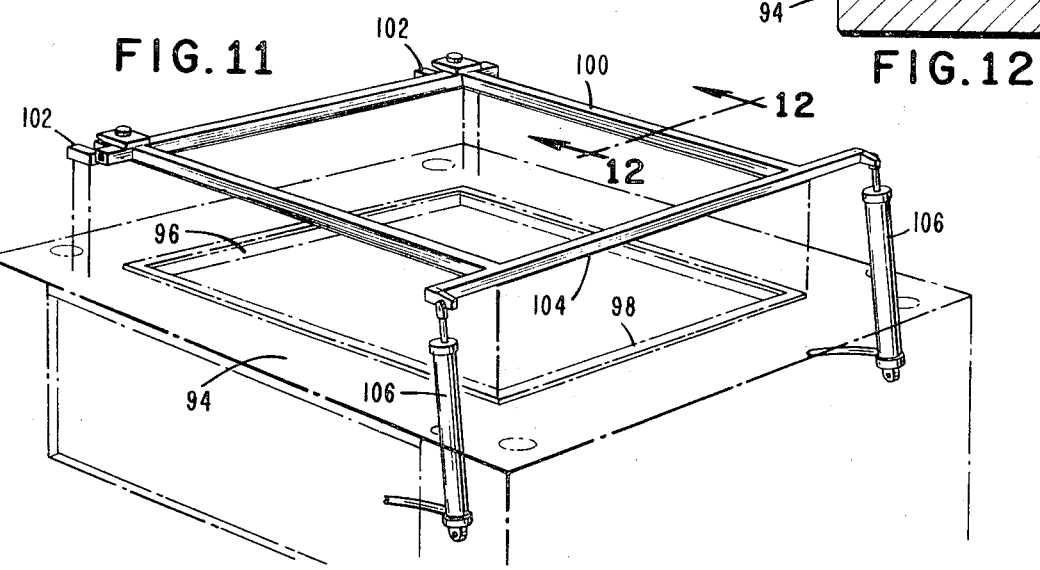

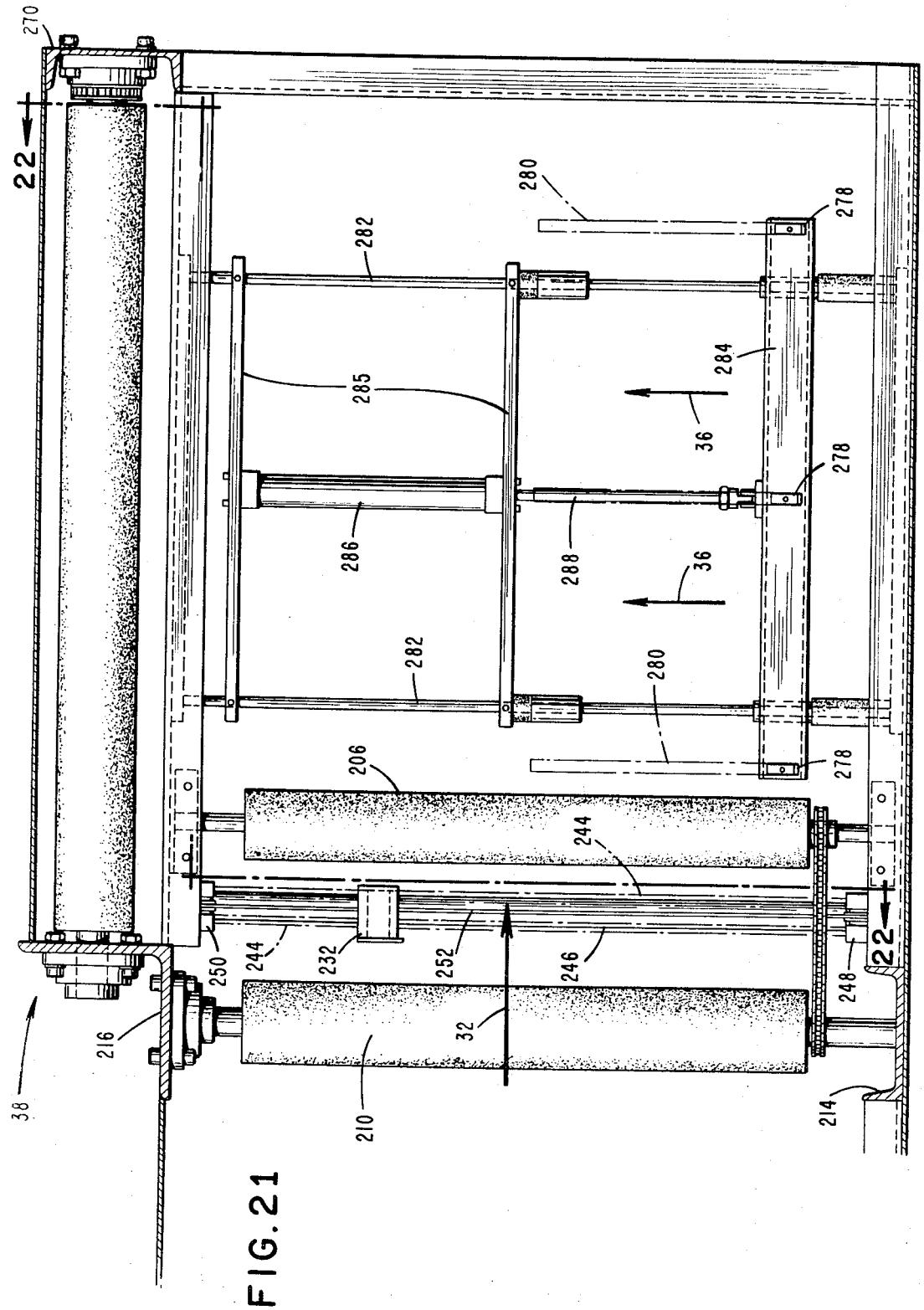

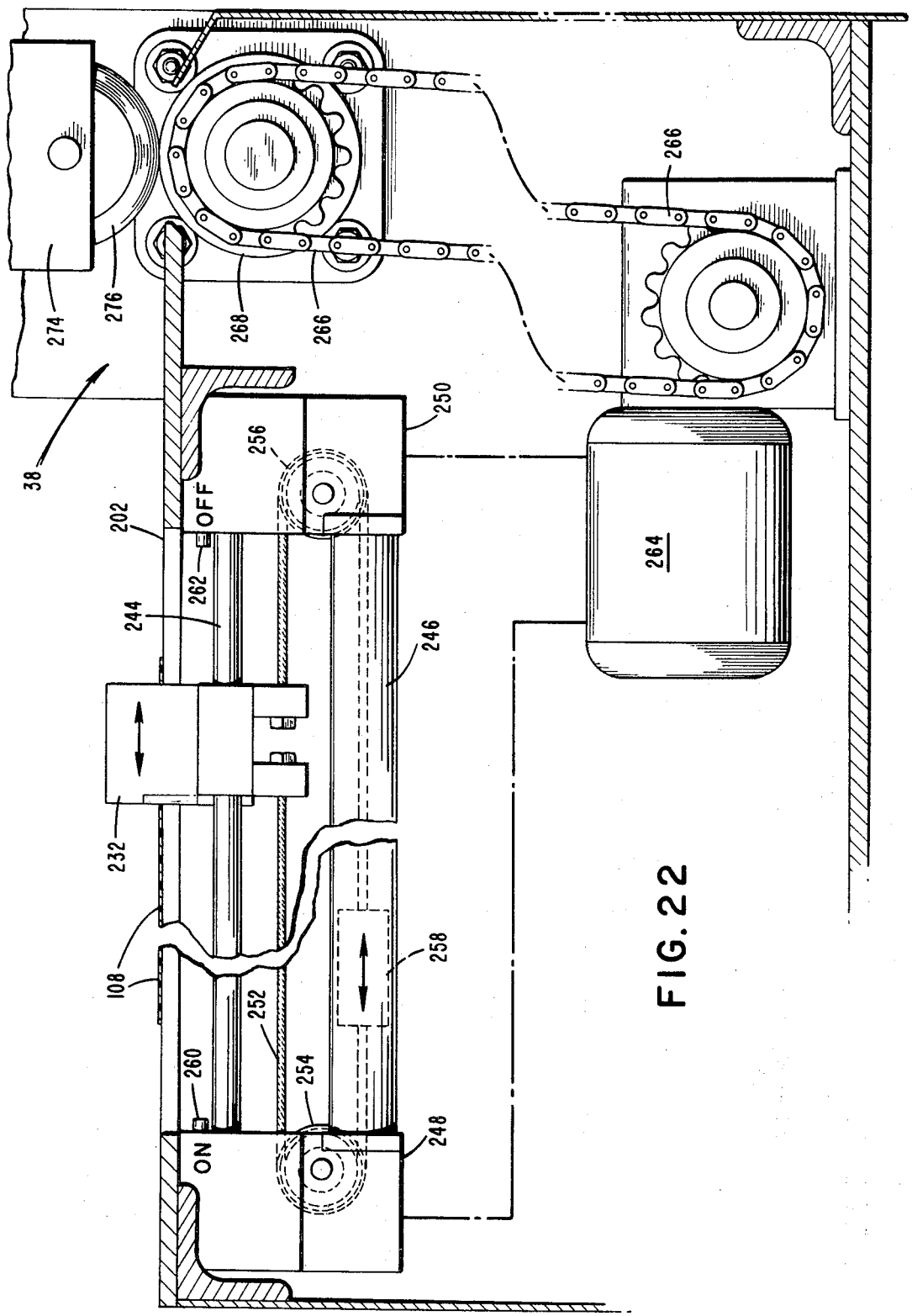

APPARATUS AND METHOD FOR SKIN PACKAGING ARTICLES

This is a division, of application Ser. No. 127,647, filed Mar. 24, 1971.

The present invention relates to improvements in skin packaging and is concerned more particularly with improved method and apparatus for skin packaging articles. The invention is also concerned with improvements in fully automatic skin packaging systems.

Consistently successful skin packaging for articles to be protected, displayed or dispensed ordinarily requires speed and economy of operation, simplicity and dependability. It is the principal object of the present invention to avoid the deficiencies of the prior art in the foregoing respects and in general to provide greatly improved skin packaging method and apparatus.

As another general object and advantage, the invention provides for a film heating and skin packaging zone or area as a nucleus module around which may be associated article feeding and trimming or other devices to suit the specific requirements of any article skin packaging problem.

In its more specific aspects, the invention provides for heating unit shield plates pivotally mounted to reflect heat toward or to direct heat away from the thermoplastic film as desired. The invention also provides for exhausting excess heat away from the loading and control areas for cooling comfort to the operator.

As another specific object and advantage, the invention contemplates cutting or trimming improvements for skin packaged articles wherein partially separated articles may be handled as a unitary sheet for final separation.

Other and further objects and advantages will be apparent from the following detailed description taken in conjunction with the accompanying drawings wherein a preferred embodiment of the principles of the invention has been selected for exemplification.

In the drawings:

FIG. 4 is a longitudinal sectional view of the loading zone and the heating and packaging zone taken along line 4—4 of FIG. 3;

FIG. 5 is an enlarged detail elevational view of one of the pusher fingers employed in the loading zone;

FIG. 7 is a transverse sectional view of the heating and packaging zone of FIG. 6 with the platen board and heater in their upper position and showing the plates in lower heat shielding position;

FIG. 8 is a detail elevation of the rack and pinion drive mechanism for the operation of the pivoted heat control plates of FIG. 7 but showing the plates in upper heat reflecting position;

FIG. 9 is a pictorial representation of the film supply roll and the skin packaged articles as they appear upon leaving the film heating and skin packaging zone;

FIG. 10 is a perspective view of the heater and platen board unit;

FIG. 11 is a perspective view of the retaining frame showing its association with the top of the skin packer and the opening therein;

FIG. 12 is an enlarged detail sectional view of the retaining frame of FIG. 11;

FIG. 21 is a top plan view, partially in section, showing the feed mechanism to the second slitter; and FIG. 22 is a cross-section of the second slitter taken along line 22—22 of FIG. 21 showing the second slitter drive means.

Figure 1:
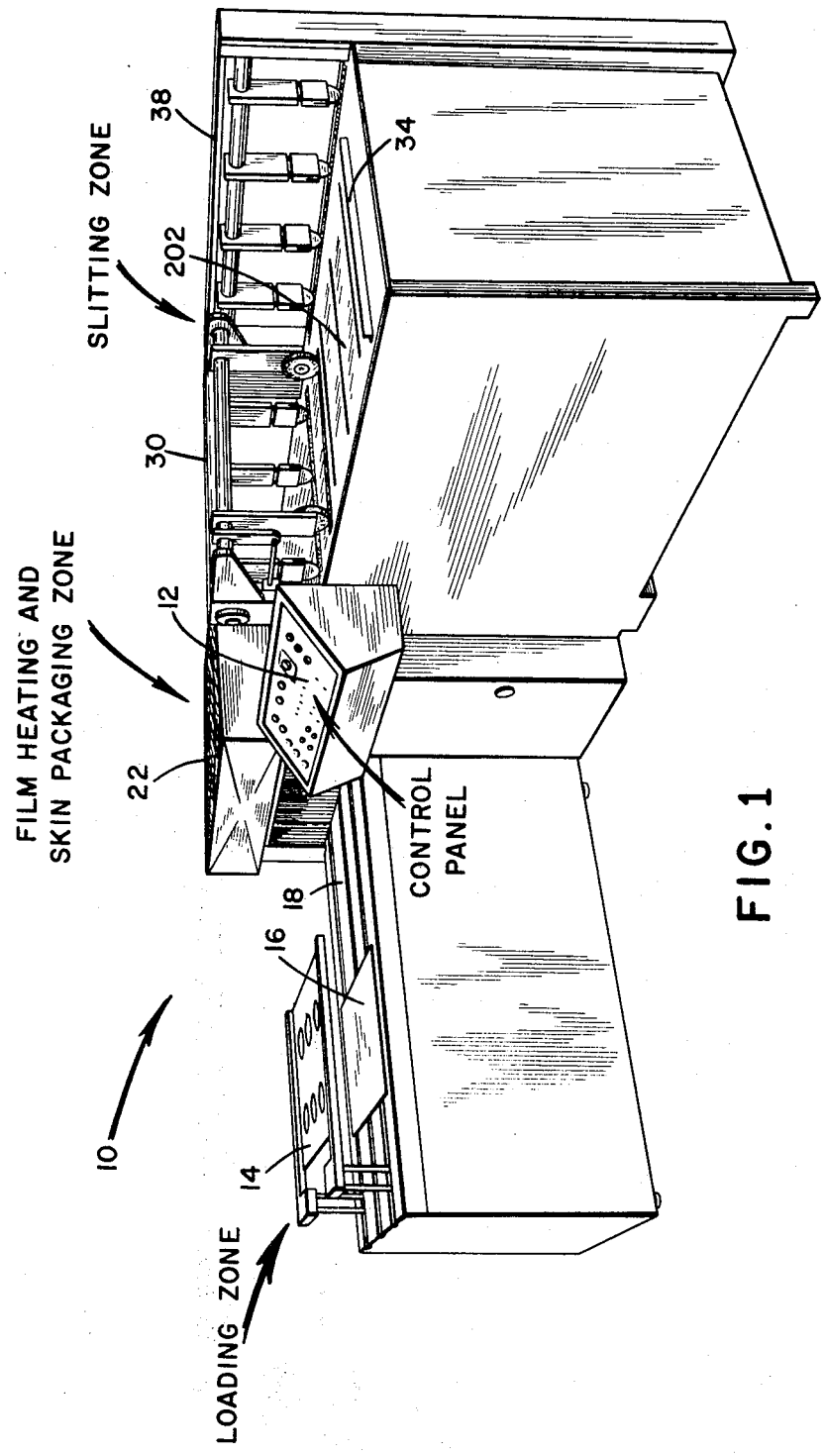
FIG. 1 is a front perspective view of an article skin packaging system constructed and arranged in accordance with the invention.

Referring more particularly to the drawings, wherein like numerals refer to like parts, the system of the present invention is indicated in its entirety by the numeral 10. As shown, particularly in FIGS. 1 and 2, the system 10 comprises a Loading Zone, as indicated by the legend and the table or console 18 for supporting an air pervious substrate or backing board 16 upon which articles to be skin packaged are placed; a Film Heating and Skin Packaging Zone, as indicated by the legend and in general by the numeral 22, in which a length of thermoplastic film is deformed by heat and the articles are skin packaged on the substrate 16; a Slitting Zone, as indicated by the legend and in general by the numerals 30 and 38, in which the film and substrate are cut to separate the individual skin packaged articles; and a Control Panel or Zone, as indicated by the legend and in general by the numeral 12, for automatically regulating the complete operation from loading to final recovery of the skin packaged articles.

Figure 2:
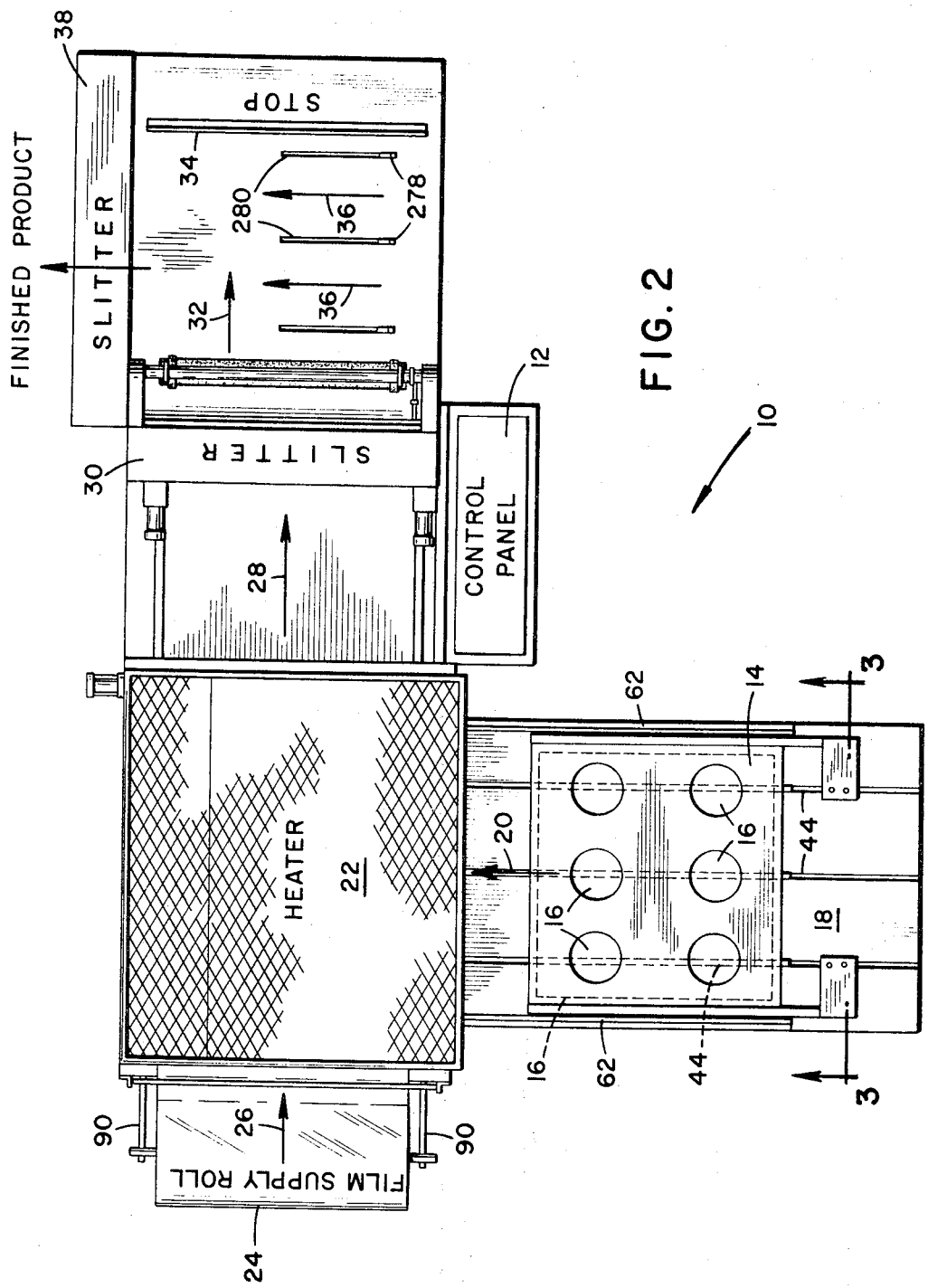
FIG. 2 is a top plan view of the system shown in FIG. 1.

The invention contemplates the Film Heating and Skin Packaging Zone 22, or skin packer as sometimes hereinafter referred to, as its basic module around which may be associated any selected devices to suit the specific needs of the particular skin packaging operation. For example, instead of hand loading articles on the substrate 16 a belt or the like conveyor may be butted to the table 18 for feeding articles directly to the substrate. The template 14, as shown in FIGS. 1 and 2 for example, is often convenient for fast and accurate positioning particularly of lightweight items on the substrate 16 but its use is optional and in many cases may be preferably omitted. Also, in some cases the slitting operation may be omitted as unnecessary and the skin packaged article automatically indexed directly from the heating and packaging zone where the packaging film is cut free from its web for recovery of the skin packaged article.

To continue with the description of the drawings, the operator will normally position himself near and within reach of the control panel 12 with the loading console or table 18 to his left. The many settings on the control panel would be chosen to determine the operation of each sequence of the packaging procedure.

As best seen in FIG. 2, the location template 14 has openings in it to assist the operator in positioning each product to be packaged in the proper location. The operator places an air-pervious substrate or backing board 16 in the loading zone, aligning it between the location template 14, and the top of loading console 18. The location template will be lowered within close relationship with the backing board at a time determined by the control setting on the panel. The operator places the products through the openings in the template onto the substrate or backing board 16. At the next predetermined time, the loaded board and template are transferred in the direction of arrow 20, to the heater and skin packer 22, which has mounted on its left side as shown the thermoplastic film web supply roll 24. The film is fed into skin packer 22, in the direction indicated by arrow 26.

After the skin packaging operation occurs within the skin packer, the package takes up a direction of travel indicated by arrow 28 toward and through the first slitter 30, and continues on as shown by arrow 32, until abutting stop 34. The package travel then changes, as indicated by arrows 36, to the second slitter 38, which separates the finished products and releases them to any standard means of conveyance where they are ready for distribution.

As will be apparent, the loading table 18, as shown, permits the loading of articles on the substrate from three sides by one to six people as may be required for the character of the articles being handled and the speed of operation of the system.

The operation of the invention will be described in further detail with reference to FIGS. 3 and 4, where the location template 14 is shown in the upper position and also in lower position, as shown in phantom line at 14. The template is maintained in horizontal position by two side support arms 40. One end of each support arm is connected to two vertical rods 42, in cantilever fashion so as to allow the other end of the arms and the template to be suspended over the loading area. The vertical rods protrude upwardly through elongated slots 44 in the top of the loading console 18.

Longitudinally aligned with, and directly under loading console top 18, is centrally located a support shaft 46 which extends substantially the entire length of the loading console, as best seen in FIG. 4. Support shaft 46 carries a slidably mounted elongated bushing 48. Connected to the bushing 48 and extending at a right angle to it is the top member of a rectangular vertical frame 50. Vertical rods 42 extend parallel with the side members of the rectangular frame 50 and pass through bushing 52 mounted on said side members of the frame 50. The lower ends of vertical rods 42 are connected to a crossbar 54. Extending downwardly from the center of crossbar 54 is mounted a cylinder 56. The upper end of cylinder rod 58 is connected to the central portion of the lower horizontal member of the rectangular frame 50.

The vertical rectangular frame 50 is thus slidably mounted on horizontal support shaft 46, by the bushing 48, and can travel substantially the length of the loading console carrying with it the vertical rods which support the location template 14 by means of the horizontal support arms 40.

The sectional view of FIG. 4 depicts the other end of the loading console as it abuts the skin packer. As indicated by phantom lines 14', the location template is moved from the loading area on the console into and back out of the skin packer as indicated by arrows 60. This is accomplished by the movement of the frame 50 along longitudinal support shaft 46 to the position as indicated by phantom lines at 50'.

The substrate or backing board 16 on which the product to be packaged is mounted is placed on the console top 18 and aligned under the location template. Alignment of the substrate 16 is assisted by the two side guide rails 62 as best seen in FIG. 3. These guide rails are located along the edge of console top 18. The location template 14 is now lowered over the backing board 16. Cylinder rod 58 is fixedly attached to frame 50. Actuation of cylinder 56 imparts a downward force on crossbar 54 lowering the rods 42 which support the template.

The items to be packaged are now placed on the substrate 16 through each of the openings in the template 14 and then transferred to the skin packer. The substrate is moved in unison with the template when the three pushers 64, mounted on the upper horizontal member of frame 50, engage the trailing edge of the substrate. The pushers 64 protrude through the elongated slots 44 in the console top 18 and travel immediately ahead of the vertical rods 42. Each pusher 64 extends forward of the rods 42 on bracket 66.

An enlarged detail of one of the pushers is shown in FIG. 5. The pusher 64 is pivotally mounted in a slot in the end of bracket 66 by pin 68. Surrounding pin 68 is a spring 70, one end of which is secured to the bracket at 72, and the other end of which is attached to the pusher at 74. The spring 70 maintains the pusher in an upright position, braced against the surface 76 of the slot in the end of the bracket 66. In the operative position, the pusher engages the board 16, shown in phantom line at 16', and urges it into the film heating and skin packaging zone in the direction shown by arrow 80. Upon returning, as indicated by arrow 82, the pusher will pivot downwardly when it contacts a new board 16 placed on the loading console or table 18.

Figure 3:
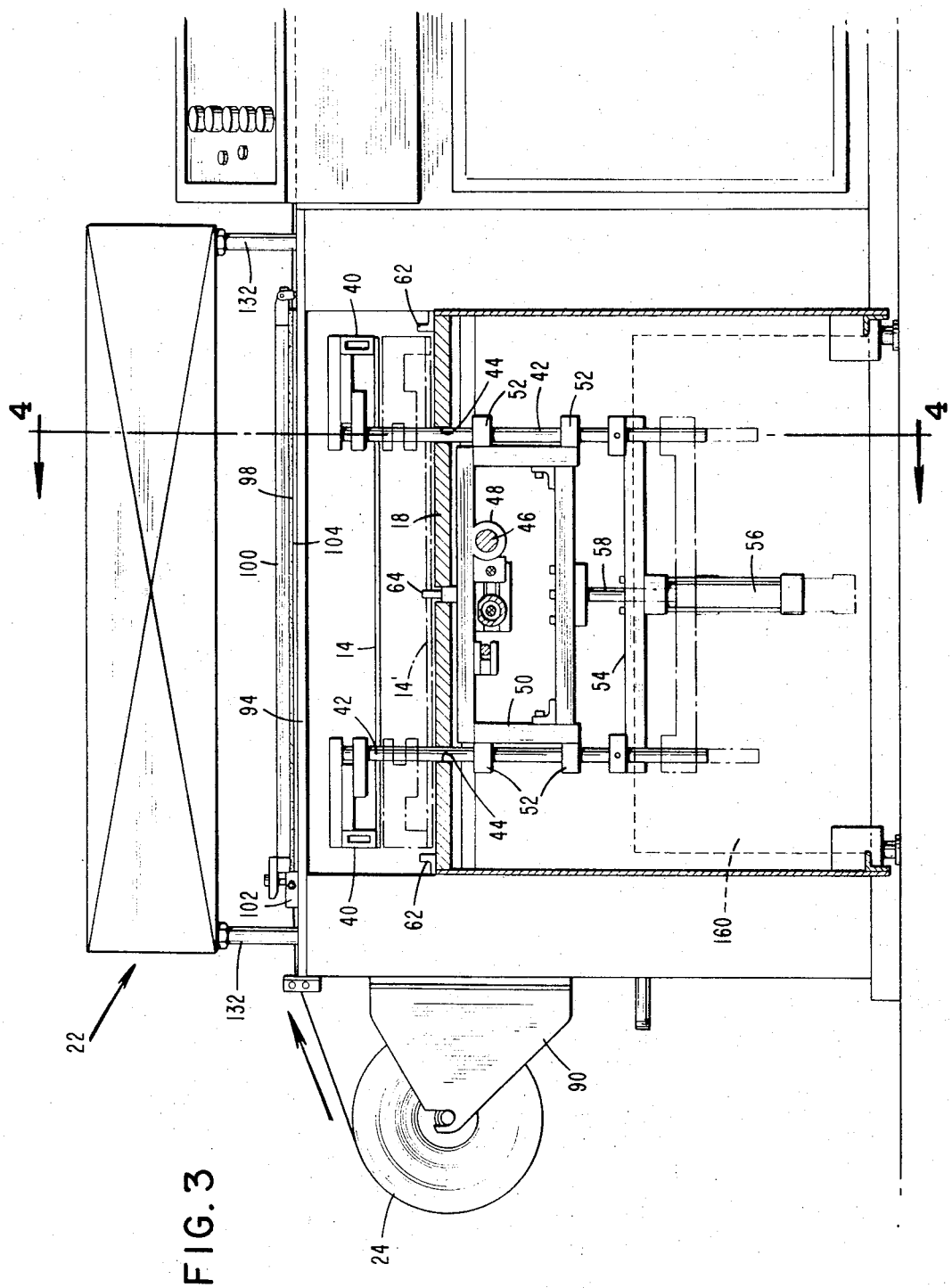
FIG. 3 is a sectional view of the loading zone taken along line 3—3 of FIG. 2.
Figure 6:
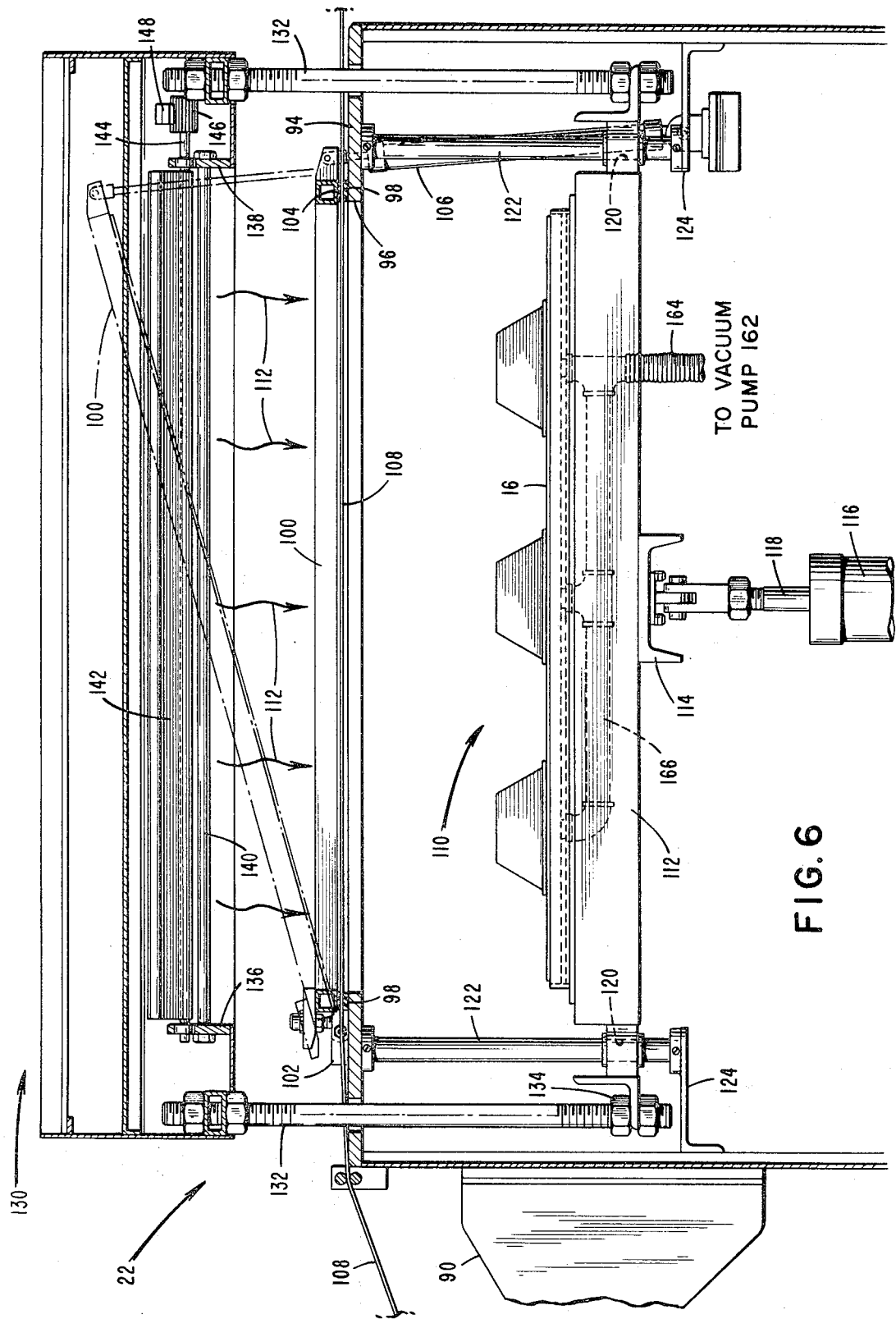
FIG. 6 is a longitudinal sectional view of the heating and packaging zone.
Figure 13:
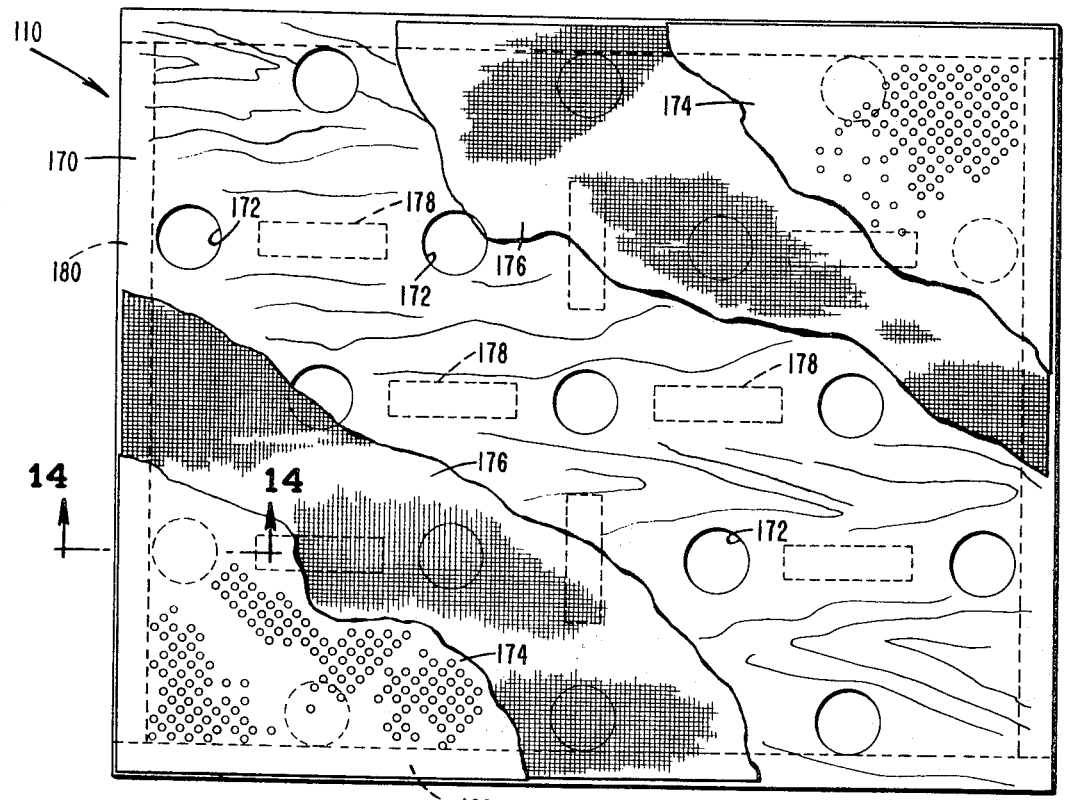
FIG. 13 is a top plan view of the platen board.

As best seen in FIGS. 3 and 6, the film web supply roll 24 is conveniently located on the side of the skin packer mounted on the bracket 90. The film 108 is drawn from the roll across the top 94 of the skin packer covering opening 96 and its peripheral resilient gasket 98. Rectangular frame 100 is secured to top 94 with hinge mountings 102. Another resilient gasket 104 of similar size and shape as the gasket 98 is secured to the bottom of frame 100. The hinged rectangular frame is raised and lowered by actuation of cylinders 106 mounted on the interior of the side walls of the skin packer. The frame 100 with gasket 104 is located on the top of the skin packer so the gaskets 104 and 98 are superimposed when the frame is in the lower position.

Actuation of cylinder 106 in a manner so the cylinder rod urges the frame 100 to the raised position as seen in FIG. 6 allows the film 108 to travel across the top of the skin packer over the opening 96. When the frame 100 is lowered, the film 108 becomes securely "picture framed" over opening 96, being sealed around the periphery of the opening between the two gaskets 98 and 104.

The parts of the film heating and skin packaging zone are now in the condition illustrated in FIGS. 3, 4 and 6. The heater and platen board unit are in the lower position. The backing board with the articles to be skin packaged, such as the small bowls or the like shown, are resting on the platen board generally designated by reference numeral 110. Heat is directed downward from the heater, as indicated by arrows 112, in the vicinity of the length of film 108 which is positioned over the opening 96. The temperature and time period of the heating is determined by the settings on the control panel previously selected by the operator.

Inside the skin packer, the platen board 110 is supported on frame 112 which has a central cross-member 114. Extending upwardly from cylinder 116 is a piston rod 118 which is attached to the mid-point of cross-member 114. Each of the four corners of frame 112 is provided with an opening containing bushings 120 which are slidably mounted on vertical guide posts 122.

The guide posts 122 are mounted on brackets 124 secured to the inner side walls of the skin packer. The upper ends of the guide posts 122 are secured to the skin packer top 94, symmetrically about the opening 96 therein. When the cylinder 116 is actuated, urging the platen board upwardly to the position shown in FIG. 7, the backing board or substrate 16 and the articles thereon will be located within the opening 96 and in contact with the length of heated film 108. The heater is also moved upwardly traveling away from the heated film 108.

Referring to FIGS. 6, 7 and 10, the heater generally indicated at 130 is supported above the platen board 110 by the four vertical rods 132, located at each corner of the heater. The lower end of each rod 132 is connected at 134 to the side members of platen frame 112 in a manner as to form a single unit of the platen and heater.

The heating means 130 is generally rectangular in shape having a protective screen cover at the top and is open at the bottom. The heating means includes transverse supports 136 and 138 to which are secured a plurality of elongated resistance units or calrods 140 extending across the open bottom of the heater 130 substantially the entire length of said heater.

Associated with each of the heating units 140 is an arcuate heat reflector or shield 142, each of which is attached to a shaft 144. Each shaft 144 is rotatably supported between 136 and 138. Extending from the support 138, the end of each shaft 144 has a pinion gear 146 attached thereto. Each of the pinion gears engages a piston driven rack 148 attached to the rod 150 extending from cylinder 152 as shown in FIG. 8.

When heat is to be applied to the film 108, the heater is lowered to close proximity with the film and the shields 142 are positioned above the heating rods 140 as shown in FIG. 8. The cylinder 152 in FIG. 8 moves the piston rod in the direction of arrow 154, urging rack 148 laterally to impart counterclockwise rotation to the pinion gears 146, thus moving the shields in the direction of arrows indicated at 156. Such rotary movement will position the shields abutting each other above the rods, forming a reflector to increase the radiation of heat in a downwardly direction indicated by arrows 112.

When the length of film is heated or deformed sufficiently, the platen and heater unit are raised and, to prevent further radiation of heat downwardly toward the film from the warm rods 140, the reflectors 142 are rotated clockwise until they abut each other under the rods, as shown in FIG. 7. This closed position of the shields 142 permits the excess heat to exhaust through opening 158 in the top of the heater, thus maintaining the loading and control front area of the apparatus at normal temperature to assure worker comfort.

Figure 14:
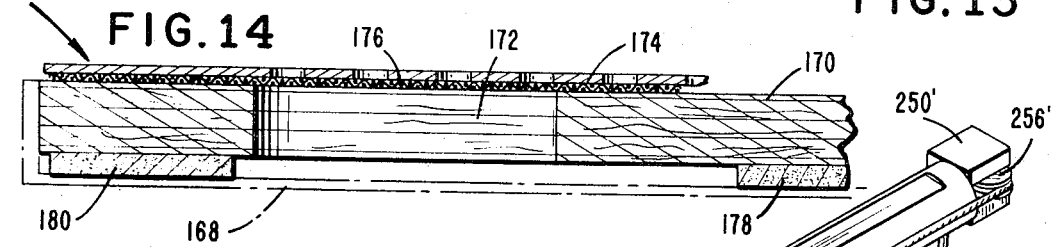
FIG. 14 is a partial sectional view of the platen board taken along line 14—14 of FIG. 13.

Air pressures from tank 160 and vacuum pump 162 are applied to the platen board 110 through hose 164 and distributed to the upper surface of the platen by piping 166. The platen board is constructed to fit within a suction box 168, to which the piping 166 is connected. The structure, as shown in FIG. 14, includes a plywood board 170 with a plurality of openings 172 uniformly arranged to apply the vacuum to the upper surface of the perforated metal layer 174 through screen 176. Spacers 178 and boarder 180 are provided between the suction box or pan 168 and the board 172 to allow the pressures to communicate with each of the openings 172 and the piping 166.

FIG. 9 shows the articles such as cupped bowls located on the substrate or backing board 16. The vacuum drawn through the air pervious backing board laminates the film to it and seals around each of the bowls or other articles. The frame 100 is raised freeing the film from around the opening 96 in the top of the packer and allowing it to be drawn away from supply roll 24. The individual packages will then be separated along the dotted lines 182 when they pass through the slitting zone now to be described.

Figure 16:
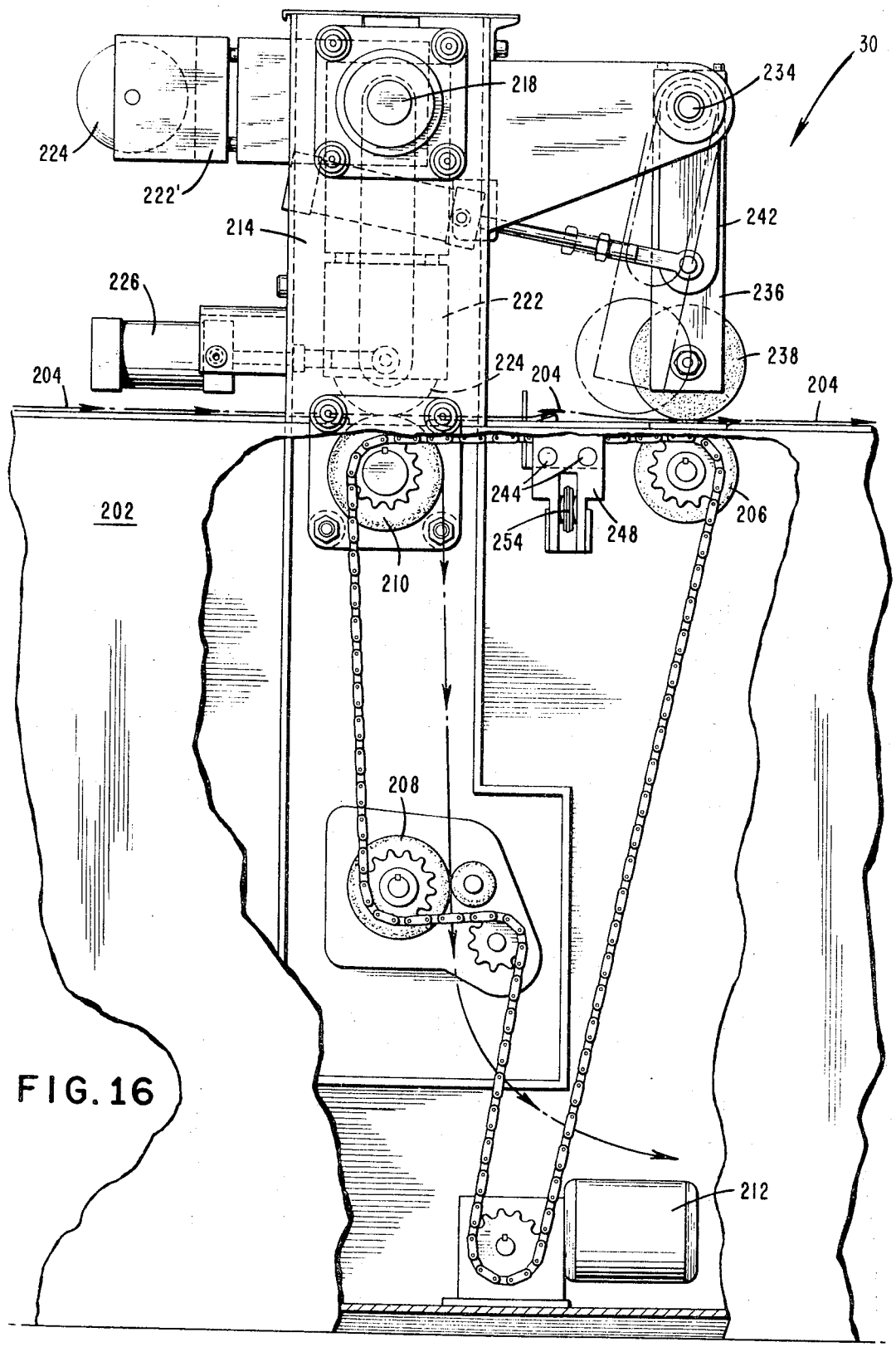
FIG. 16 is a schematic representation of the drive means of the first slitter.
Figure 17:
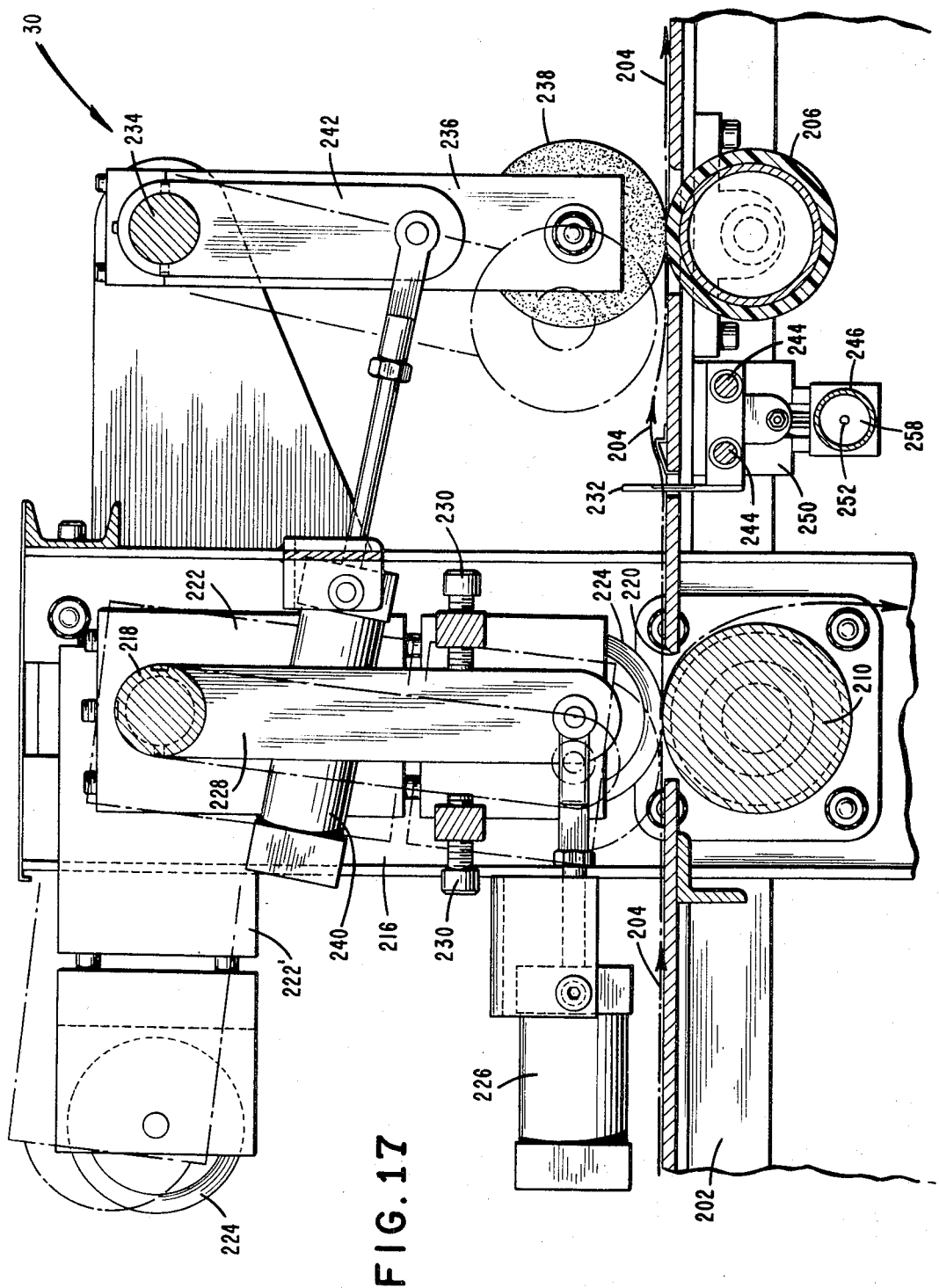
FIG. 17 is a cross-section of the first slitter showing rotary knife and pinch rollers.
Figure 18:
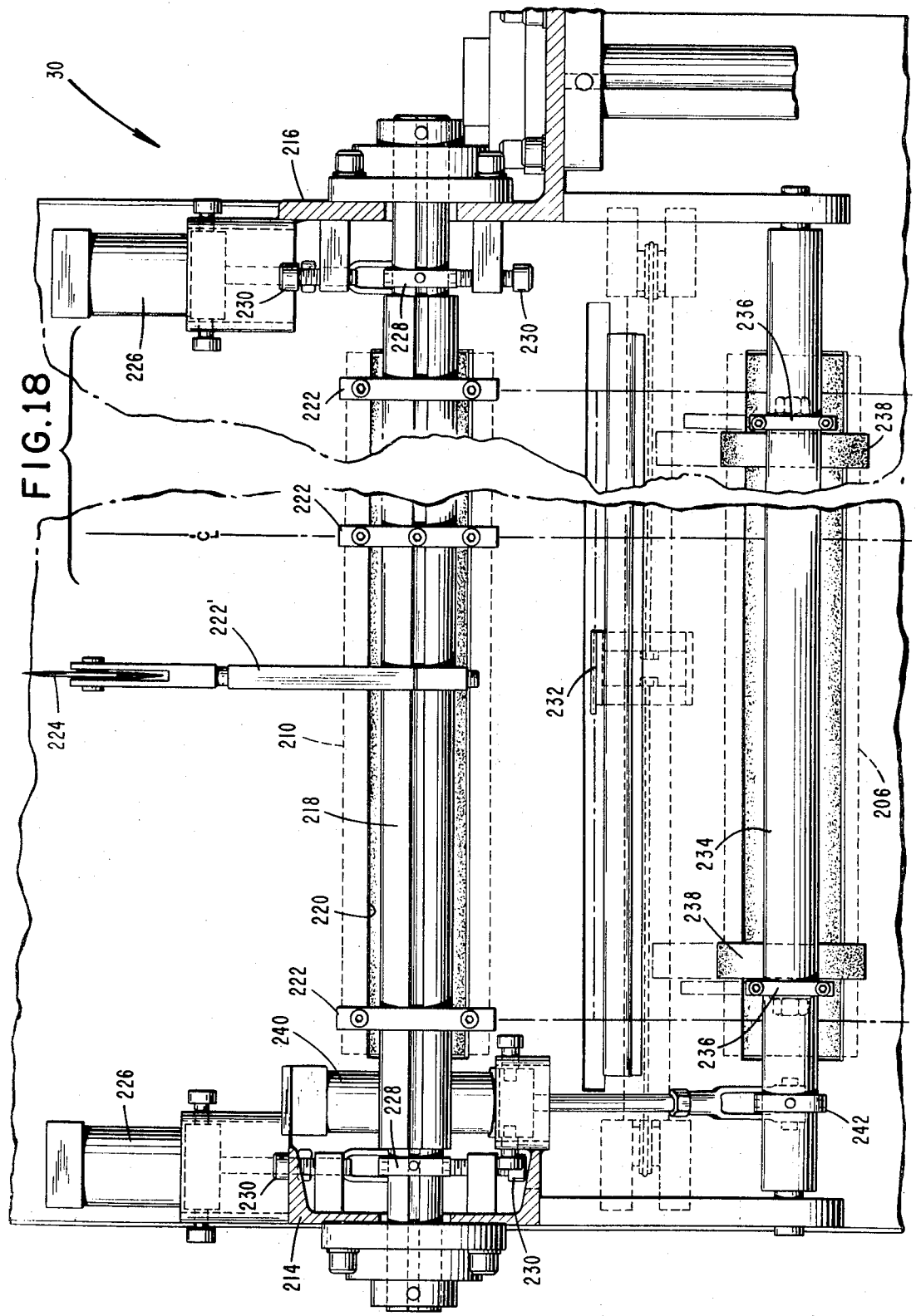
FIG. 18 is a top plan view, partially in section, of the first slitter.

The slitter means are best illustrated in FIGS. 1, 2 and 16–19. Referring now to the first slitter means 30, the film 108 and the sealed packaged substrate travel along the top surface of the table or console 202, which is a continuation of the top of the skin packer. The level and direction of travel as indicated by a plurality of arrows 204 are imparted to the film by pinch rolls 206, 208 and drive roll 210. In FIG. 16 there is shown a chain and sprocket arrangement driven by the motor 212 for rotating rollers 206, 208 and 210.

Figures 19, 20:
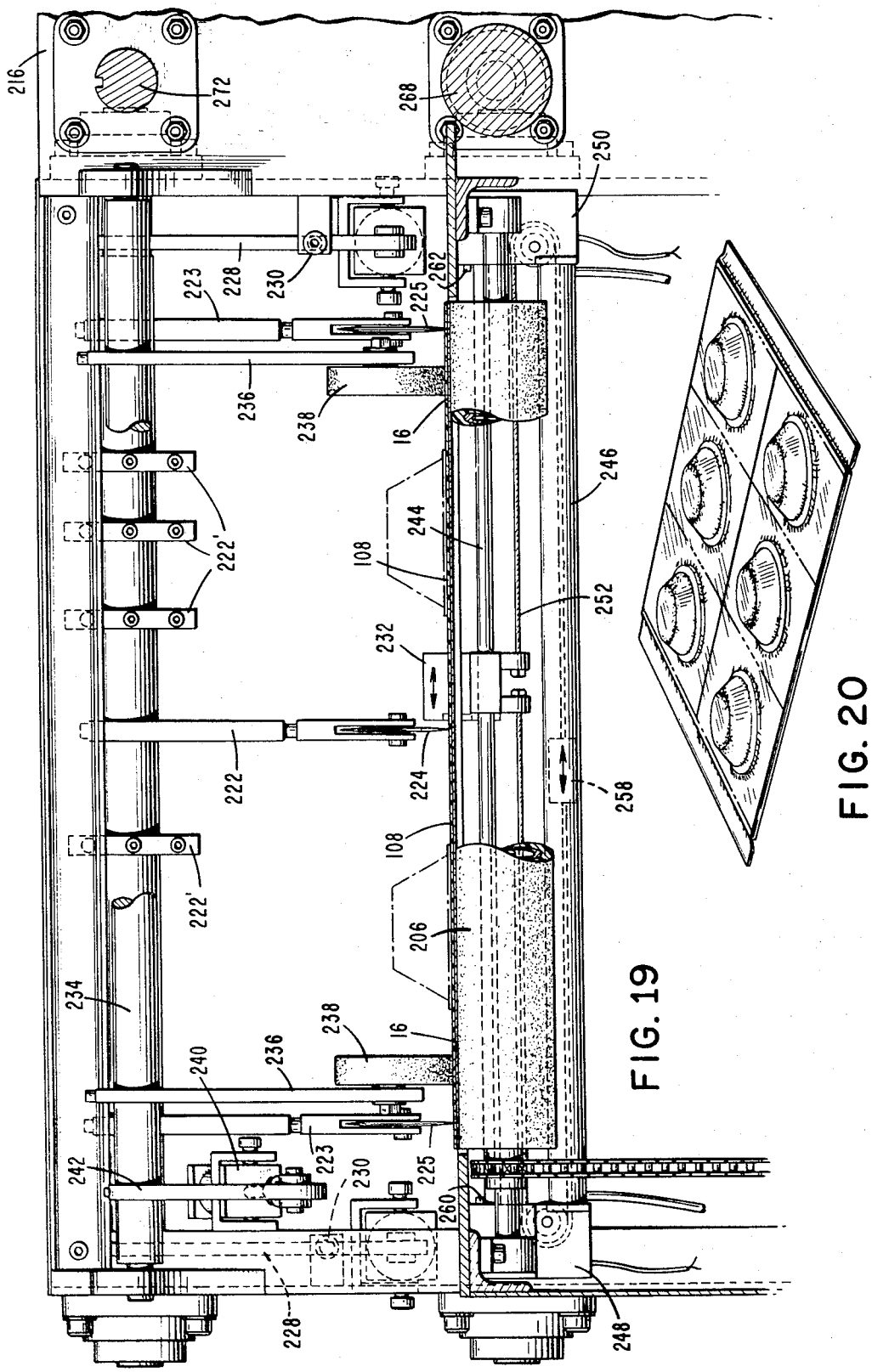
FIG. 19 is an elevational view of the slitter of FIG. 18 showing the rotary knives and the cross-cut knife and second slitter activating switch.
FIG. 20 is a pictorial representation of the substrate and skin packaged articles after being cross-cut from the first slitter with phantom indications of the cutting pattern of second slitter.

The preferred structure of the slitter mechanism 30 comprises, two vertical frame members 214 and 216, which support the drive roll 210 and a shaft 218 which is pivotally mounted within the vertical plane transverse to the film and the level of travel. Drive roll 210 is exposed to tangential contact with the level of travel through opening 220 in the top of table 202. Knife support arms 222 in any desired number are clamped to shaft 218 at selected intervals and preferably in a vertical position. Knife support arms which will not be used in any particular slitting operation may be clamped to the shaft in a horizontal position, as shown at 222'. Each knife support is clamped to the shaft 218 by a set screw in the end of the support arm. At the opposite end of each support arm 222 is mounted a rotary knife 224, which in operative condition contacts roll 210 for longitudinally slitting the interposed skin packaged substrate. As shown in FIG. 19, only a single knife 224 is necessary in the particular slitting operation illustrated but it is to be understood that any other number of knives may be employed to effect longitudinal slitting appropriate for the character of skin packaged articles.

The film passes over roll 210 and will be cut wherever a knife is so positioned as to contact said roll. The vertical frame members each support a cylinder 226. The piston rod extending from each of the cylinders 226 is connected to the lower end of a lever 228 suspended downwardly near each end of the shaft 218 adjacent said frame members. Actuation of the cylinders 226 imparts movement to lever 228 which rotates the shaft 218. The shaft 218 with rotary knives clamped thereto is rotated so as to bring the knives in and out of contact with roll 210, thus controlling the slitting operation in a manner to leave an uncut border at the forward and trailing end portions of the skin packaged substrate to maintain alignment of the longitudinally slitted strips. The outermost rotary knives 225 mounted upon the outermost support arms 223 trim the side edges of board 16 and film 108. These knives are supported in like manner but are restricted from rotation with the pivoting action of shaft 218 so the trimming is continued the entire length of the substrate laminate.

An area which may be approximately one inch is trimmed from the substrate or backing board. This trimmed strip of both board and film at each side of the package is passed through opening 220 in the top of console 202. As seen in FIG. 16, the strip is trimmed at roll 210 and then travels downwardly to pinch roll 208. The strips are accumulated inside console 202. The motor 212 drives rolls 206, 208 and 210 in unison imparting travel to the substrate and film along the top of the console. Roll 206 is located in relation to the level of travel in the same manner as roll 210.

Located between rolls 206 and 210 is the cross-cut knife 232 extending upward through a slot in the top of console 202. Pinch roll 206 imparts travel to the package until the package is indexed in alignment with the second set of slitters 38. After the package has been severed from the film by cross-cut knife 232, pinch roll 206 and its associated pinch wheels 238, disengage as will be described below, freeing the package for movement toward the second set of slitters 38.

Vertical frame members support a second horizontal shaft 234 above the level of travel and within the vertical plane of roll 206 transverse to the level of travel. The upper end of two pinch roll arms 236 are secured to shaft 234 and are suspended downwardly in a generally vertical position. Rotatably mounted on the lower end of each of the arms 236 is a pinch wheel 238 which makes tangential contact with pinch roll 206. When a package is located over pinch roll 206 and each of the wheels 238 is directly over the roll, the package is pinched, and if roll 206 is being driven, the package will travel away from the first slitter. Pinch wheels 238 may be moved into or out of contact with roll 206. When the wheels are directly over roll 206, they are in contact with it. A cylinder 240 is pivotally mounted on the inner side of vertical frame member 214. The piston rod of cylinder 240 is connected to the lower end of a lever 242 suspended from shaft 234 in the same manner as levers 228. When the cylinder 240 is actuated lever 242 rotates the shaft 234 pivoting arm 236 with the wheels 238 moving in and out of contact with roll 206.

The cross-cut knife 232 is slidably mounted on two transverse parallel rods 244 located within console 202 and is moved transversely across the console when cable cylinder 246 is actuated. Rods 244 and the cylinder 246 are secured to the frame of the console at mountings 248 and 250. The knife is connected to cable 252 which passes over pulleys 254 and 256 located in mountings 248 and 250, respectively. The cable 252 then travels through cylinder 246 along its longitudinal axis and is connected to piston 258. Wehn the cylinder 246 is actuated, the piston travels the entire length of the cylinder, moving the cable 252 around and over pulleys 254 and 256, thus imparting movement to knife 232.

Figure 15:
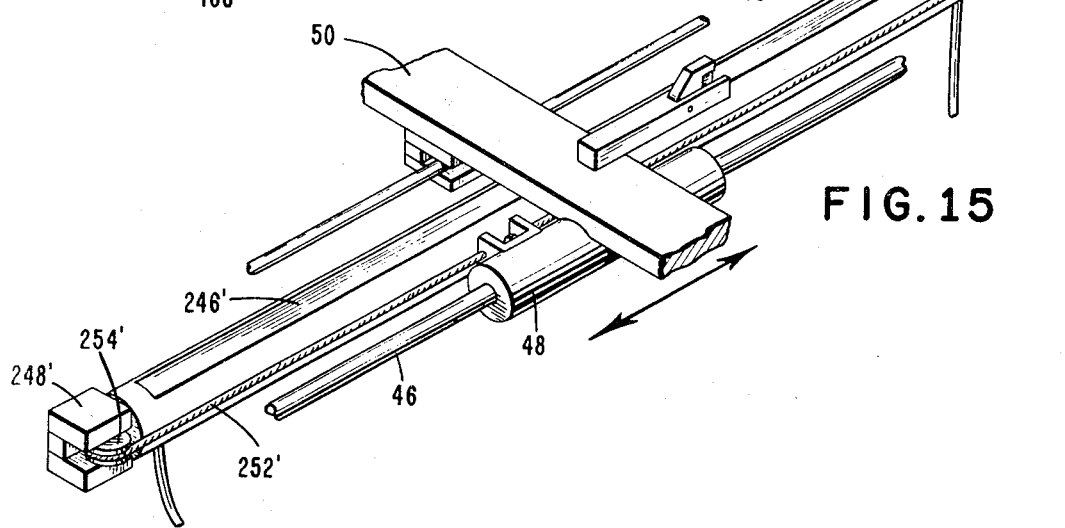
FIG. 15 is a perspective view of the cable cylinder employed to transfer the backing board and products from the loading area onto the platen board within the film heating and skin packaging zone.

As depicted in FIG. 15, a similar cable-cylinder arrangement is employed to drive frame member 50 of the loading console. The cable 252' is connected to bushing 48 and passes over pulleys 254' and 250', respectively, and through cylinder 246'.

Extending inwardly from each of the mounts 248 and 250 are switches represented schematically at 260 and 262, as best shown in FIG. 22. At each extreme of travel rods 244, the knife 232 contacts and activates either switch 260 or switch 262. At rest, the knife is in contact with the "off" switch 262 on mount 250. When the substrate laminate has passed through the first slitter means 30 and comes to rest at stop 34 on the top of console 202, the cross-cut knife is moved along rods 244 by actuation of cylinder 246 transversely across the console 202, severing the film and freeing the substrate and skin packaged articles at rest in front of the second slitter means 38. Upon arrival of knife 232 at mount 248, contact is made with "on" switch 260 housed within the mount 248. Actuation of switch 260 starts motor 264 mounted on the floor of console 202 to drive a second chain and sprocket arrangement 266 thus rotating the second slitter drive roll 268.

The second slitter, designated at 38, is constructed in similar manner to that of the first slitter 30 and is positioned at one side of, and at a right angle to, the first slitter. The rear vertical support 216 of slitter 30 is of right angle configuration. The drive roll 268 is supported along the rear edge of the top of console 202 by the vertical support 216 and another vertical support 270 located at the rear corner of the console. At the top of the vertical supports 216 and 270, a horizontal shaft 272, similar to shaft 234 of the first slitter, is mounted with vertical rotary knife support arms 274 clamped thereto. The knife support arms are fixed in vertical position so as to maintain the rotary knives 276 in tangential contact with drive roll 268 and clamped at the desired location along shaft 272 transversely to cut the substrate laminate and to separate the individual skin packaged articles.

With the substrate and skin packaged articles at rest against the stop 34 in front of the second slitter means 38, the fingers 278 protruding up through elongated slots 280 in the console top, as shown in FIG. 2, engage the edge of the substrate and urge it rearwardly toward the path of the rotary knives of the second slitter means 38. Within the console, two horizontal rods 282 are secured to front and back frame of console 202 and slidably mounted on the rods 282 is a bracket 284 which carries the fingers 278.

Fixedly attached to rods 282 are mounting brackets 285 for cylinder 286. Actuation of cylinder 286, secured to the brackets 285, will move piston rod 288 connected to bracket 284. The fingers 278 carried by bracket 284, will move the substrate through the second slitter knives, thus separating the individual skin packaged articles. Cross-cut knife 232 then returns to the rest position against mount 250, contacting "off"

switch 262 housed therein. This stops motor 264 and chain and sprocket arrangement 266, and drive roll 268 is again at rest until reactivated when the succeeding laminated substrate 16 and skin packaged articles are severed by the cross-cut knife 232 and indexed against the stop 34.

The full structure and operation of the method and apparatus embodying the present invention is now believed to be readily apparent without further discourse. It is to be understood, however, that the invention is not confined to the particular construction and arrangement of parts or sequence and manipulation of steps as herein illustrated and described, but embraces all such modifications thereof as may come within the scope of the following claims.

We claim:

1. Apparatus for separating individual skin packaged articles from a substrate carrying rows of skin packaged articles which comprises;
   first slitter means for longitudinally cutting the substrate and skin packaged articles in lengthwise strip portions,
   means for operating said first slitter means so as to leave an uncut border at the opposed ends of the substrate to maintain alignment of said strip portions, and
   second slitter means for transversely cutting said strip portions to separate the individual skin packaged articles.

2. The apparatus of claim 1 wherein the slitter means comprise rotating discs.

3. The apparatus of claim 2 wherein the discs of the first slitter means are elevated above the substrate to form the uncut border.

4. The apparatus of claim 1 additionally including means for trimming the opposed longitudinal edge portions of the substrate.

5. The method of separating individual skin packaged articles from a substrate carrying rows of skin packaged articles which comprises;
   providing a slitting zone,
   passing the substrate to said slitting zone,
   longitudinally slitting the substrate between rows of skin packaged articles to form lengthwise strips while maintaining an uncut border at the opposed ends of the substrate, and
   transversely slitting said strips between rows of skin packaged articles to separate the individual skin packaged articles.

6. The method of claim 5 wherein the slitting zone is provided with first and second pluralities of rotating discs for performing the longitudinal and transverse slitting steps, respectively.

7. The method of claim 6 wherein selected discs of the first plurality of rotating discs are elevated above the substrate to form the uncut border.

8. The method of claim 7 additionally including the steps of trimming the side edge portions of the substrate.

* * * * *